United States Patent [19]
Dix et al.

[11] 3,950,736
[45] Apr. 13, 1976

[54] PROGRAMMABLE SOLID STATE CONTROL FOR MACHINE TOOL OR PROCESS CONTROL SYSTEMS

[75] Inventors: James A. Dix, Greenfield; James J. Eckl, Milwaukee, both of Wis.

[73] Assignee: Square D Company, Park Ridge, Ill.

[22] Filed: Feb. 7, 1975

[21] Appl. No.: 548,117

[52] U.S. Cl. .......................................... 340/172.5
[51] Int. Cl.² ..................... G06F 15/46; G06F 9/02
[58] Field of Search ............ 340/172.5; 328/72, 75; 318/567, 568, 162; 235/151.1

[56] References Cited
UNITED STATES PATENTS

| | | | |
|---|---|---|---|
| 3,651,477 | 3/1972 | Bartlett | 340/172.5 |
| 3,719,931 | 3/1973 | Schroeder | 340/172.5 |
| 3,744,029 | 7/1973 | Nyman | 340/172.5 |
| 3,881,172 | 4/1975 | Bartlett | 340/172.5 |

*Primary Examiner*—Gareth D. Shaw
*Assistant Examiner*—James D. Thomas
*Attorney, Agent, or Firm*—William H. Schmeling; Harold J. Rathbun

[57] ABSTRACT

A programmable signal processor having solid state components which can be programmed to duplicate the control functions of an electromechanical relay panel. The processor includes an AND memory matrix having a plurality of individual inputs and outputs which are connectible through diodes to outputs of solid state gated input memories and through jumpers to inputs of solid state gated feedback memories. The input memories have inputs which are switched by external inputs to the processor. The feedback memories are switched by outputs of the AND memory and provide input signals to the AND memory which simulate the signals provided by normally closed and normally open contacts of a relay. The outputs of the AND memory are selectively connected through wire jumpers to the inputs of the feedback memories and circuits which control the outputs of the processor so the feedback memories and output circuits of the processor will switch in response to outputs from the memory in an OR logic manner. The combination of the AND logic functions provided by the AND memory and the OR logic functions provided by the jumpers permits the processor to be programmed using Boolean logic equations or directly programmed from a conventional relay schematic or ladder diagram without using special programming language. A two phase clock provides output signals which causes all of the input memories to switch simultaneously in response to changes in the external inputs to the processor to eliminate races between the switching of the input memories. The clock also causes all of the feedback memories to switch simultaneously in response to changes in the outputs of the AND memory to eliminate races between the instants of switching of the feedback memories. The instants of switching of the input memories and the feedback memories are out of phase to eliminate races between the input signals and the feedback signals within the processor and the processor to operate with greater noise immunity.

12 Claims, 7 Drawing Figures

PROGRAMMABLE SOLID STATE CONTROL FOR MACHINE TOOL OR PROCESS CONTROL SYSTEMS

The present invention relates to programmable sequential switching circuits and is more particularly concerned with a solid state signal processor employing a diode memory matrix and jumpered wired connections between the outputs of the memory and logic units and output circuits of the processor.

In the control of production machines and processes, it is a common practice to use sensing devices, such as limit switches, pressure switches, motion detectors and the like, to provide signals to indicate the state of operation of the machine or process. In very simple systems, the inputs from the sensing devices are supplied to electromagnetically operated relays which are energized and de-energized in response to the input signals and control the operation of output devices, such as motors, valves and the like, so the machines and processes will operate as designed. In the more sophisticated systems, computers or controls known as central processing units are used to control the output devices in response to the inputs from signals from the sensing devices. While computer type controls have been used successfully for many control systems, their capability is frequently far in excess of most system requirements and therefore are costly and usually require the designer of the system to have special programming knowledge to program the computer so the computer will provide the required control functions.

The signal processor according to the present invention is intended to be used in systems more complex than simple relay systems employing a small number of relays and less sophisticated than a system having a large number of inputs and outputs which would require the services of a central processing unit or a computer. In the processor, the required AND logic functions are implemented by an AND memory which is provided by a diode matrix and wire jumpers which function to provide the OR logic functions in Boolean equations. This arrangement permits programming of the processor to be easily accomplished by users familiar with relay circuit design directly from relay ladder diagrams without special programming knowledge, as is usually required to program computers and central processing units. The use of diodes to provide an AND logic memory in sequence controllers is well known, as illustrated in U.S. Pat. No. 3,264,612, which was granted to Edward W. Yetter on Aug. 2, 1966. While the control as disclosed in the Yetter patent may be used to control a machine tool or process, its flexibility and speed or operation is limited by the time required to sequentially scan the outputs of the AND memory and the arrangement which requires the outputs of the AND memory to be sequentially delivered as inputs to an AND matrix which controls the outputs of the processor.

It is an object of the present invention to provide a programmable signal processor for controlling the state of the output signals of the processor in response to the state of a plurality of input signals to the processor in a machine or process control system.

Another object is to provide a signal processor for controlling the sequence of operations in a machine or process control system that may be programmed by selectively connecting diodes between the inputs and the outputs of a memory and jumpers between the outputs of the memory and the inputs of feedback memories of the processor so the processor may be readily programmed by relatively unskilled personnel directly from a relay ladder diagram.

A further object is to provide a programmed signal processor for a machine or process control system with gated input memories which receive the inputs to the processor and provide inputs to a diode memory indicative of the state of the inputs to the processor, and to program the processor by selectively connecting diodes between the inputs and the outputs of the diode memory and jumpers between the outputs of the diode memory and inputs of gated feedback memories so the processor will provide output signals in an AND logic and an OR logic manner in response to the input signals and if required to use jumpers, to selectively connect time delays, memories, counters and shift register circuits between the outputs of the diodes and inputs to the feedback memories or outputs of the processor.

Further objects and features of the invention will be readily apparent to those skilled in the art from the following specification and appended drawings illustrating certain preferred embodiments, in which:

Figure 1:
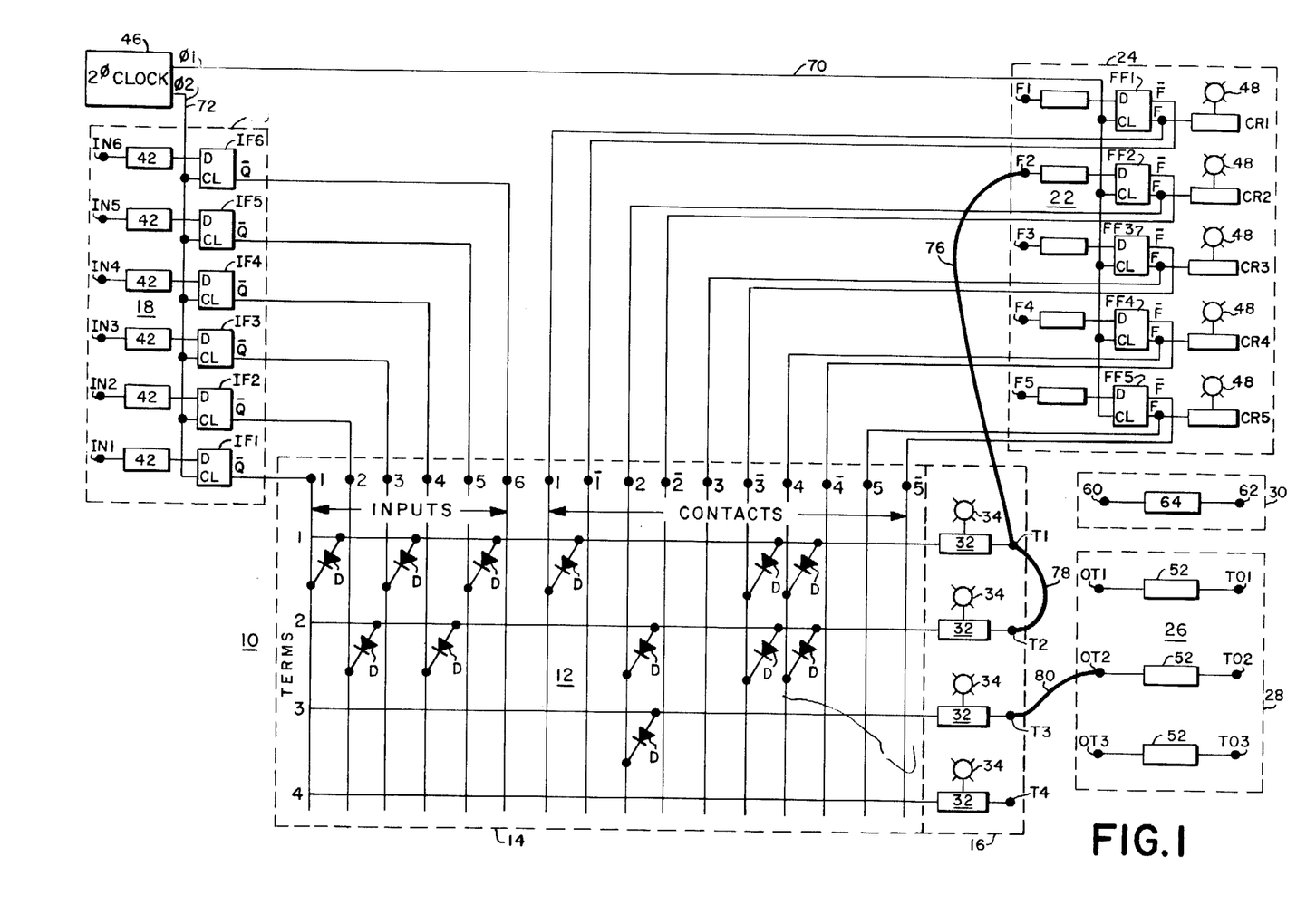
FIG. 1 is a simplified schematic logic circuit diagram of the programmable signal processor according to the present invention.

The programmable signal processor 10 as illustrated in FIG. 1 includes solid state components which preferably are mounted on a plurality of printed circuit cards or boards to provide dedicated functions within the processor. The processor 10 includes at least one AND memory 12 illustrated as enclosed within a broken-line rectangle 14. The AND memory 12 includes the functions provided by the components within the broken-line rectangle 16. The processor 10 also includes an input memory section 18 enclosed within a broken-line rectangle 20, a feedback memory section 22 enclosed within a broken-line rectangle 24 and an output circuit section 26 enclosed within a broken-line rectangle 28. When required, the processor 10 may also include suitable circuits and components within the broken-line rectangle 30 which are designed and selected to act as time delay circuits to duplicate the function of a TDE (time delay after energization) relay, a TDD (time delay after de-energization) relay, a memory which duplicates the function of a latching relay, a counter which duplicates the function of a stepping relay, a shift register and any other solid state circuit which functions to provide specific type outputs in response to one or more inputs.

The AND memory 12 may be furnished in either of two forms in the processor 10. In one form the memory is essentially a PROM (Programmable Read Only Memory) and is formed as a plug-in printed circuit board containing sockets into which integrated circuit diode array chips are inserted and conductors interconnecting the diodes within the chips. When the PROM memory is programmed, the circuits connecting the appropriate unwanted diodes are burned away so they are essentially removed, leaving the remaining undisturbed diodes to provide the program.

In the other form, the memory 12 is furnished as a diode pin matrix board having spaced input and output conductors which are selectively interconnected by diode pins D. In the preferred form, the matrix, which per se is not part of the present invention as it is a commercially available item, provides the vertical columns labelled inputs and contacts and the horizontal rows labelled terms in FIG. 1. The vertical columns are formed as spaced parallel conductive bus bars extending in a common plane on an insulating support and connected to individual terminations. The terminations for one set of columns are designated as inputs 1–6. The terminations for a second set of columns are grouped in pairs and designated as contacts $1-\bar{1}, 2-\bar{2}$ ... $5-\bar{5}$. The horizontal conductors, labelled terms, are formed as spaced parallel conductive bus bars which are spaced by the support to extend in a common plane that is parallel and spaced rearwardly from the plane of the vertical bars. Each vertical bus bar and each horizontal bus bar is formed as a pair of closely spaced conductive strips so that the vertical and horizontal bus bars, when viewed from the front of the matrix, will resemble a grid with the apparent intersections of the vertical and horizontal bars presenting a square shaped opening. Each of the diode pins D, which may be inserted into the square openings, has a conductive tip portion which conductively engages portions of one of the horizontal bars and a conductive shank portion insulated and spaced from the tip portion which conductively engages portions of the vertical bar when the pin is inserted into the matrix. Each diode pin D has a diode connected between the tip and shank portion which is poled so the cathode of the diode is connected to the vertical bus bar and the anode is connected to the horizontal bar when the diode pin D is inserted into one of the openings in the matrix to connect an individual vertical bar with a horizontal bar.

Figure 4:
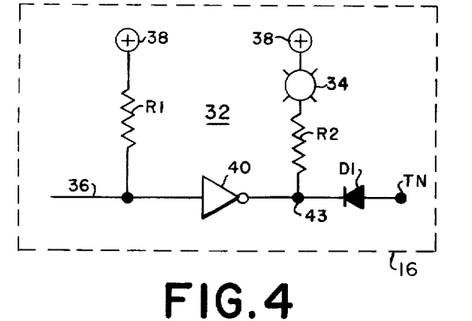
FIG. 4 is a simplified schematic logic circuit diagram of one of a plurality of detecting and light indicating circuits used in the circuit shown in FIG. 1.

Each of the horizontal bus bars, indicated as terms 1–4, is connected through an individual detecting circuit 32, including a light emitting device 34 to an output terminal which are designated as T1–T4 for the terms 1–4, respectively. The detecting circuits 32 and light emitting diodes 34 are identical and, as illustrated in FIG. 4, each receives an input on a lead 36 from its associated term 1–4. The lead 36 is connected through a resistor R1 to a positive terminal of a D.C. source 38 and through an inverter 40 to a junction 43. The junction 43 is connected through a resistor R2 and one of the light emitting devices 34, which preferably is a light emitting diode, to the positive D.C. source 38. A diode D1 has its cathode connected to the junction 43 an its anode connected to its associated output T1–T4, designated as a termination TN in FIG. 4.

Figure 2:
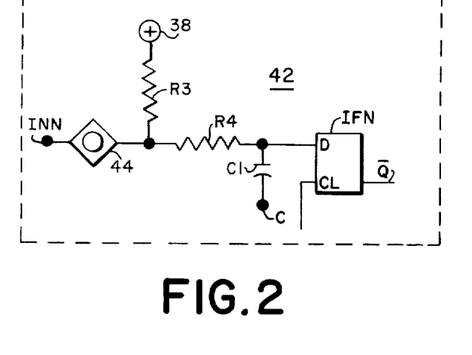
FIG. 2 is a simplified schematic logic circuit diagram of one of a plurality of input memory circuits used in the circuit shown in FIG. 1.

Each of the inputs 1–6 of the AND memory 12 is connected to a $\bar{Q}$ output of a D flip flop which are designated as IF1–IF6, respectively, in FIG. 1 in the input memory section 20. The circuits associated with each flip flop IF1–IF6 are identical and are illustrated in FIG. 2 as controlling the memory state of a D flip flop IFN. It is well known that the D in a D flip flop stands for delay and a D flip flop is a flip flop whose output is a function of the input which appeared one pulse earlier; for example, if a "1" appeared at the input, the output after the next clock input will be a "1" at the Q output and a "0" at the $\bar{Q}$ output.

The input signals from the sensing devices, such as limit switches, pressure switches and the like, associated with the machine or process to be controlled by the processor 10 are connected to input terminals IN1–IN6 of the processor. In accordance with standard control wiring practices, the voltage of these input signals may be 120 VAC to increase the integrity of the control input signals. Each 120 volt input signal to the terminals IN1–IN6 is converted and reduced to a logic level voltage signal by a suitable converter-filter circuit 42, one of which is shown in FIG. 2, and supplied as an input signal to the input D of one of the input flip flops IF1–IF6. As illustrated in FIG. 2, the 120 volt input signal at the input terminal INN is converted to a logic voltage level by a signal converter 44 and filtered by resistors R3 an R4 and a capacitor C1 before it is applied to the input D of the flip flop IFN. Each of the clock inputs CL of the flip flops IF1–IF6 receives a phase 2 ($\phi 2$) clocking signal from a two phase clock 46. The phase 2 ($\phi 2$) clock signals to clock inputs CL of the flip flops IF1-IF6 are used to gate the flip flops IF–IF6 so the flip flops IF1–IF6 act as memories during the intervals between phase 2 ($\phi 2$) clock pulses for the purpose as will be later described.

Figure 3:
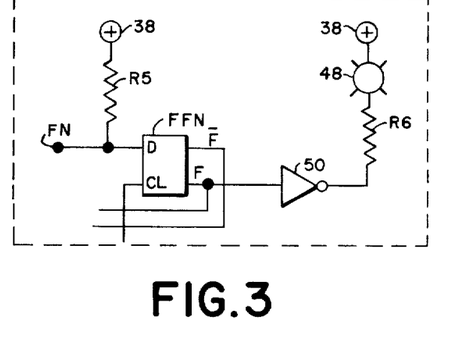
FIG. 3 is a simplified schematic logic circuit diagram of one of a plurality of feedback memory circuits used in the circuit shown in FIG. 1.

The feedback memory section 22 includes a plurality of D flip flops designated as FF1–FF5 in FIG. 1, each of which is connected in the manner in which flip flop FFN is connected in FIG. 3, to receive inputs at its input D and its clock input CL and provide output signals at its Q and $\bar{Q}$ outputs which are respectively designated as $\bar{F}$ and F outputs. The state of each flip flop FF1–FF5 is indicated by a light emitting device which may be provided by a light emitting diode 48. As shown in FIG. 3, the input D of the flip flop FFN is connected to an externally accessible termination FN which corresponds to one of the terminations F1–F5 in FIG. 1. The termination FN is connected through a resistor R5 to the source 38. The output F of the flip flop FFN, which functions to duplicate the normally open contact function in an electromagnetically operated relay, is connected to one of a pair of contact input terminals 1–5 of the memory 12. The output F is also connected through an inverter 50 and a resistor R6 to one side of the light emitting diode 48 which has its other side connected to the D.C. source 38. The output $\bar{F}$ of the flip flop FFN, which functions to duplicate the normally closed contact function in a relay, is connected to the other of the pair of contact input terminals 1–5 of the memory 12 to which the output F is connected. Thus the outputs F of the flip flops FF1–FF5 are respectively connected to the contact inputs $\bar{1}-\bar{5}$ of the memory 12 and the outputs $\bar{F}$ of the flip flops FF1–FF5 are respectively connected to the contact inputs $\bar{1}-\bar{5}$ of the memory 12.

Figure 5:
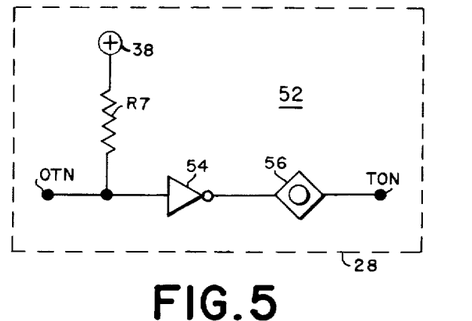
FIG. 5 is a simplified schematic logic circuit diagram of one of a plurality of output circuits used in the circuit shown in FIG. 1.

The output circuit section 26 includes a plurality of identical individual circuits 52, one of which is shown in FIG. 5. Each of the circuits 52 includes an input termination which is designated as OT1-OT2-OT3 for the three circuits 52 in FIG. 1, and OTN in FIG. 5. The circuits 52 also have output terminations designated as T01, T02 and T03 in FIG. 1, and TON in FIG. 5. The output terminations T01–T03 provide the output terminals of the processor 10 and are connected to control the energization of the output devices in the machine or process control system which is controlled by the processor 10. As shown in FIG. 5, the input termination OTN is connected through a resistor R7 to the D.C. source 38 and through an inverter 54 to the input of an output amplifier 56 which has its output connected to the output termination TON. The output amplifier 56 is of the well known commercially available type which in response to the low voltage logic input signal will provide a higher voltage and current output at the terminal TON which is capable of energizing a solenoid, motor starter or a valve.

If required, the processor 10 may also include one or more solid state circuits which are designed, using techniques and components well known to those skilled in the art, to duplicate the functions of timers, latch relays, counters, shift registers and the like, as may be included within the broken line rectangle 30. Each of the circuits includes an input termination 60, an output termination 62, and suitable circuits indicated by numeral 64 which are connected between the terminations 60 and 62 to provide the required function as described.

Figure 6:
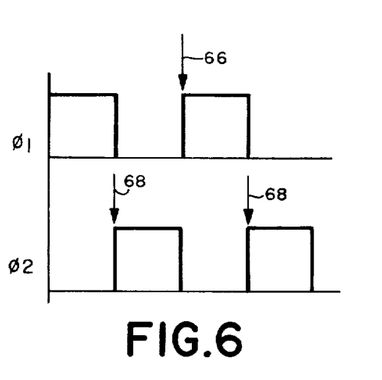
FIG. 6 illustrates the output signals of a clock which causes the memories in the circuit shown in FIG. 1 to switch at the instants designated by arrows.

The processor 10 also includes the clock 46 which provides a pair of output signals $\phi 1$ and $\phi 2$ that are out of phase with each other as illustrated in FIG. 6, which change from a logic "0" to a logic "1" signal at the instants indicated by the arrows 66 and 68, respectively. The phase one ($\phi 1$) signals are fed as clocked input gating signals by a lead 70 to the clock inputs CL of all of the feedback flip flops FF1–FF5 so the flip flops act as logic memories between the phase one ($\phi 1$) clocking pulses. The phase two ($\phi 2$) signals are fed as clocked input gating signals by a lead 72 to the clocked inputs CL of all of the input flip flops IF1–IF6 so the flip flops IF1–IF6 act as logic memories between the phase two ($\phi 2$) clocking signals.

In a commercial form, the processor 10 is provided with 32 input terminations corresponding to the inputs IN1–IN6 and the associated input flip flops IF1–IF6, 32 outputs corresponding to outputs T01–T03, 32 flip flops corresponding to the feedback flip flops FF1–FF5, each of which has a pair of outputs connected to a pair of contact inputs of the AND memory 12 and 120 terms which correspond to the terms 1–4 of the AND memory 12. Thus the commercial form of the processor is capable of duplicating the functions of a fairly complex relay circuit when it is programmed in a similar manner as the processor 10 in FIG. 1 is programmed to execute the functions required in the hypothetical ladder diagram circuit shown in FIG. 7.

Figure 7:
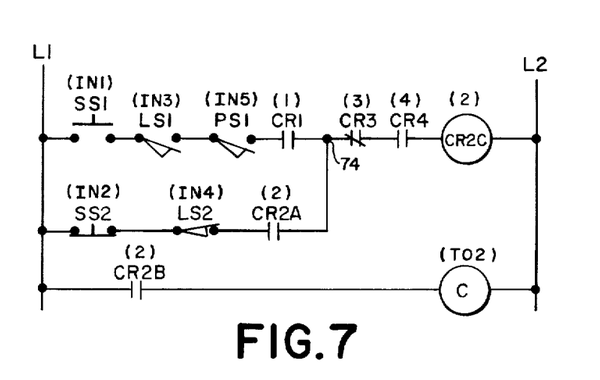
FIG. 7 is a schematic ladder diagram of typical circuit to illustrate the manner in which the signal processor according to the present invention is programmed.

The relay ladder diagram circuit as shown in FIG. 7 includes a pair of bus leads L1 and L2, a start/stop switch having normally open contacts SS1 and normally closed contacts SS2, open limit switch contacts LS1, closed limit switch contacts LS2, open pressure switch contacts PS1, open contacts CR1 and CR4 of a pair of relays having coil windings, not shown, closed contacts CR3 of a relay having a coil winding, not shown, a relay coil winding CR2C having a pair of contacts CR2A and CR2B which close when the coil winding CR2C is energized and a coil winding C of a contactor or motor starter.

The contacts SS1, LS1, PS1 and CR1 are connected in series in an initiating circuit between the L1 bus and a junction 74. Connected in parallel with the initiating circuit between the L1 bus and the junction 74 to provide an interruptable holding circuit are series connected contacts SS2, LS2 and CR2A. The relay coil winding CR2C has one side connected directly to the L2 bus and its other side connected through series connected contacts CR3 and CR4 to the junction 74. The contactor coil winding C has one side connected directly to the bus L2 an its other side connected through contacts CR2B to the bus L1.

It is obvious that the relay coil winding CR2C will be energized when the start switch SS1 is closed and the contacts LS1, PS1, CR1, CR3 and CR4 are closed or the relay coil winding CR2C is energized when the contacts CR2A and the contacts SS2, LS2, CR3 and CR4 are closed. Further, whenever the relay coil winding CR2C is energized, contacts CR2B will be closed and the contactor coil winding C will be energized.

The programming of the processor 10 to provide the circuit functions in FIG. 7 may be readily accomplished without requiring any special programming knowledge on the part of the programmer. For illustration purposes, the programming of the processor 10 will be based on using the diode pin matrix memory in the AND memory section 12. The programming of the processor 10 is a two-step process with the major portion of the programming executed by programming the diode pin matrix to take care of the logic AND functions and the remaining portion of the programming being executed by jumper wires to satisfy the OR functions of the program. It must be understood that the contacts and coils referred to in the programming example are not the actual electromechanical relay contacts and coils, but rather the processor 10 solid state equivalents of these devices.

Initially, each of the external circuits containing the inputs from the sensing devices, such as the start/stop switches SS1 and SS2, as well as the limit switch LS1 and the pressure switch PS1, is assigned to one input terminal of the input memory section 18 as indicated by the designation within the parenthesis above the switching contact designation. As designated, the start switch contact SS1 is connected to the input IN1 of the signal converter associated with the terminal IN1; similarly, the circuits associated with the stop switch SS2, the limit switch LS1, the limit switch LS2 and the pressure switch PS1, are connected to the inputs IN2, IN3, IN4 and IN5, respectively. After the inputs have been wired to the signal converters associated with inputs IN1–IN5, the input columns on the diode pin matrix board become the programming location for these machines or process inputs. The diode pin matrix board also includes a plurality of columns labelled contacts. The columns designated contacts are programming locations for the normally open and the normally closed contacts of the relay coils in the circuit. While in the example only a single output device, e.g., contactor coil winding C, is shown, it is obvious the processor 10 is capable of controlling the energization of a large number of output devices. For purposes of illustration, the circuit associated with the coil winding C is connected to the output terminal OT2 of the output circuit section 26. When the processor 10 is programmed from a relay ladder diagram, one circuit between the leads L1 and L2 is programmed at a time. While the processor 10 is shown as being capable of being programmed to decode 4 terms, the number of terms may be expanded to any desired number. A term is defined as one complete path of series contacts from the L1 lead up to, but not including, the coil winding associated with the series contacts.

Term 1 of the diode pin matrix board is programmed to provide the functions of the initiating circuit including the start switch SS1 by inserting diode pins D between the term 1 and the inputs 1, 3 and 5 which programs the contacts SS1, LS1 and PS1, respectively. The normally open contacts CR1 and CR4 are programmed by inserting diode pins D between term 1 and the contact inputs 1 and 4, respectively. The normally closed contact CR3 is programmed by inserting a diode pin D between term 1 and the contact input $\bar{3}$ to complete the programming of term 1.

The coil winding CR2C is programmed by connecting a hand insertable wire jumper 76 between the output termination T1 and the termination F2 of the feedback memory section. When the foregoing programming has been accomplished, term 1 will be satisfied when inputs SS1, LS1, PS1 are closed and coils controlling contacts CR1, CR4 and not CR3 are energized. When term 1 is satisfied, feedback flip flop FF2 will be switched to an ON state.

Term 2 is used to program the second line or the holding circuit of the ladder diagram including the stop switch SS2 by inserting diode pins D between the term 2 and the inputs 2 and 4 which programs the contacts SS2 and LS2, respectively. The normally open contacts CR2A and CR4 are programmed by inserting diode pins between term 2 and contact inputs 2 and 4, respectively. The normally closed contact CR3 is programmed by inserting a diode pin D between the term 2 and the contact input $\bar{3}$ to complete the programming of term 2.

The next programming step is to program the processor 10 so coil winding CR2C is energized whenever term 2 is satisfied. This programming step could be accomplished by connecting a jumper wire, not shown, between the terminations T2 and F2. However, since coil winding CR2C is energized whenever term 1 or term 2 is satisfied, the programming can be accomplished by connecting a wire jumper 78 between the terminations T1 and T2 so the feedback flip flop FF2 will be switched ON whenever term 1 or term 2 is satisfied.

Term 3 is used to program the third line of the ladder diagram including the coil contacts CR2B and the contactor winding C by inserting a diode pin between term 3 and the contact input 2 to program the contact CR2B to complete the programming of term 3.

The next programming step is to program the processor 10 so the contactor coil winding C is energized whenever term 3 is satisfied. This programming step is accomplished by connecting a hand insertable jumper wire 80 between the termination T3 and the termination OT2 of the output circuit section 26. When the foregoing programming has been completed, the processor 10 will function as follows.

When the processor 10 is programmed as above described, and the start switch SS1 is open and the coil winding CR2C is de-energized with the remaining switch and relay contacts in the state illustrated in FIG. 7, the following conditions will prevail within the circuits and components within the processor 10. As hereinafter used, a logic "1" signal represents a positive voltage signal that has a higher voltage level than a "0" logic signal. While the circuit described thus uses positive logic voltages, it is obvious the circuit may be constructed to use negative logic signals without departing from the scope of the present invention. The open contacts SS1, LS1 and PS1 will cause a "1" input signal to be present at the D inputs of input flip flops IF1, IF3 and IF5, respectively, which causes the flip flops IF1, IF3 and IF5 to be in their reset states. The closed switching contacts SS2 and LS2 will cause a "0" input signal to be present at the D inputs of flip flops IF2 and IF4, respectively, which causes flip flops IF2 and IF4 to be switched on. Each of the flip flops FF1–FF5 is reset to provide a "0" at its F output and a "1" at its $\bar{F}$ output. Thus, because of the manner in which the function of the relays associated with the contacts CR1, CR2A and CR2B, CR3 and CR4 is programmed to be duplicated by the state of the flip flops FF1–FF4, respectively, the logic signals appearing at the contact inputs 1, 2 and 4 of the AND memory 12 will be "0" and the input to the contact input $\bar{3}$ will be "1". The "1" input to the D inputs of the input flip flops IF1, IF3 and IF5 will cause their associated $\bar{Q}$ outputs to be "0" and therefore cause the inputs 1, 3 and 5 of the AND memory 12 to be "0". The "0" inputs to the D inputs of the input flip flops IF2 and IF4 will cause their associated $\bar{Q}$ outputs to be "1" and therefore cause the inputs 2 and 4 of the AND memory 12 to be "1".

Thus, when the switching contacts are in the condition shown in FIG. 7, and the AND memory 12 is programmed by the diode pins D as shown in FIG. 1, term 1 will have a logic "0" impressed thereon because the "0" at any of the inputs 1, 3 and 5, as well as any of the contact inputs 1 and 4, causes associated diode connections with term 1 to conduct and maintain term 1 at a logic "0".

Similarly, term 2 will have a logic "0" impressed thereon because the "0" at either of the contact inputs 2 and 4 causes their associated diode connections with term 2 to conduct and maintain term 2 at a logic "0". Likewise, term 3 will have a logic "0" impressed thereon because the "0" at the contact input 2 causes its associated diode connection with term 3 to conduct and maintain term 3 at a logic "0".

Referring to FIG. 4, the logic "0" on the terms 1, 2 and 3 causes their associated leads 36 in FIG. 4 to be "0" which causes the inverter 40 to provide a "1" at junction 43 which causes the light emitting diode 34 to be extinguished and the diode D1 to be back-biased so a "1" appears at the terminal TN which corresponds to the outputs T1, T2 and T3 of the terms 1, 2 and 3. The "1" at outputs T1 and T2 is supplied to the input F2 of the feedback flip flop FF2 which causes the flip flop FF2 to remain in its reset state and continue to provide a "1" at its $\bar{F}$ output and a "0" at its F output. The logic "1" at output T3 is supplied to the input termination OT2 which, as illustrated in FIG. 5, causes its associated inverter 54 to supply a "0" to the output amplifier 56 and the output terminal T02 which causes any output device, such as a relay, valve or starter connected thereto, to be de-energized.

When the conditions in the process or machine controlled by the circuit shown in FIG. 7 are in a state wherein the start switch SS1, the limit switch LS1 and the pressure switch contacts PS1 are closed, and the flip flops FF1 and FF4 are switched on to simulate the energization of relays associated with contacts CR1 an CR4, the following conditions will prevail within the processor 10. The closure of the contacts SS1, LS1 and PS1 will cause a "0" to be supplied to the D inputs of the flip flops IF1, IF3 and IF5, respectively, each of which switches on to change its $\overline{Q}$ output to "1" after its D input changed from "1" to "0" when the phase two ($\phi 2$) signal from the clock 46 changes from "0" to "1" at the instants indicated by arrow 68 in FIG. 6. The terminals F1 an F4 are connected to terms, not shown, which when satisfied will provide a "0" input to the D inputs of the flip flops FF1 and FF4 and cause the flip flops FF1 and FF4 to switch on after their associated D input is switched from "1" to "0" when the phase one ($\phi 1$) signal from the clock 46 changes from "0" to "1" at the instants indicated by the arrow 66 in FIG. 6. Thus when the flip flops IF1, IF3, IF5, FF1 and FF4 are switched as described, the inputs 1, 3 and 5 of the AND memory 12 will be "1" and the contact inputs 1 and 4, as well as the contact input $\overline{3}$ will be "1" so that all of the inputs associated with term 1 are "1". The "1" at all of the inputs will cause all of the diodes connected between term 1 and its associated inputs to be back-biased so that the lead 36 in the detecting circuit 32 associated with term 1 as illustrated in FIG. 4 is supplied in a "1" input. The "1" on lead 36 is inverted by the inverter 40 and supplied as a "0" to the junction 43 which causes the light emitting diode 34 to be illuminated visually indicating that term 1 is satisfied. The "0" at the junction 43 causes a "0" to appear at the output T1 which is connected through the jumper 76 to the input F2 so that the input to the D input of the flip flops FF2 changes from "1" to "0". The "1" to "0" input change to the D input of the flip flop FF2 causes the flip flop FF2 to switch on in response to the next phase one ($\phi 1$) clock signal and causes the outputs F and $\overline{F}$ of flip flop FF2 to become "1" and "0", respectively. The $\overline{F}$ output of the flip flop FF2 is connected to the contact input 2 of the AND memory 12. Thus, as the stop switch SS2 and the limit switch LS2 contacts are closed, the inputs 2 and 4 of the AND memory 12 are "1" as previously described. Also, as the flip flops FF1, FF2 and FF4 have been switched on, the contact inputs 2 and 4 of the AND memory 12 will be "1", as described. At this time it is assumed that the flip flop FF3 has not been switched on so that the input signal to the contact input 3 remains "1". Thus all of the inputs associated with term 2 are satisfied, which causes the detecting circuit 32 associated with term 2 to operate and cause the light emitting diode 34 to be illuminated, indicating term 2 is satisfied and the signal at output T2 to become "0" in the same manner as when term 1 was satisfied and its associated diode 34 was illuminated and its output T1 became "0". The output T2 is connected through the jumper 78 to the output T1 so that the input to the D input of the flip flop FF2 remains "0" when the signal at output T1 becomes "1" as may be caused by the opening of the start switch SS1.

Term 3 is connected through the diode pin D to the contact input 2 which has a "1" impressed thereon to simulate the closing of the contacts CR2B to satisfy term 3 and cause its associated light emitting diode 34 to be illuminated and the output T3 to become "0" in the same manner as when term 1 was satisfied. The output T3 is connected through the jumper 80 to the input termination OT2 of the output circuit section 26. Each of the input terminations OT1-OT3 is connected to an individual output circuit 52 illustrated by the circuit shown in FIG. 5 as terminal OTN. Thus, when the output T3 becomes "0", the input termination OTN becomes "0" and causes the inverter 54 to supply a "1" input to the output amplifier 56 which causes the output device represented by the coil C to become energized.

The coil winding C will remain energized in response to an output terminal TO2 as long as flip flop FF2 is switched on. It will be seen portions of the initiating circuit and holding circuits connected between bus L1 and junction 74 are connected in an OR logic configuration and the circuit extending between junction 74 and the relay coil CR2C is connected in an AND logic configuration with the OR connected portions of the initiating and holding circuits. Thus the relay coil CR2C will be de-energized when contacts CR3 or CR4 are open. The function provided by the contacts CR3 and CR4 is simulated by the flip flops FF3 and FF4 respectively in the processor 10. The normally open contact function of contacts CR4 is duplicated in the processor 10 by the connection between the F output of the flip flop FF4 and contact input 4 and the connecting diodes D between the contact input 4 and terms 1 and 2 so that whenever flip flop FF4 is reset, terms 1 and 2 will not be satisfied and flip flop FF2 will be reset. The normally closed contact function of contact CR3 is duplicated in the processor 10 by connection between the $\overline{F}$ output of the flip flop FF3 and the contact input $\overline{3}$ and the connecting diodes D between the contact input $\overline{3}$ and terms 1 and 2 so that whenever flip flop FF3 is switched on, flip flop FF2 will be reset. The normally open contact function of the contacts CR1 is duplicated in the processor 10 by the connection between the F output of the flip flop FF1 and the contact input 1 and the connecting diode between the contact input 1 and term 1 so that whenever flip flop FF1 is reset, term 1 will not be satisfied. The switching of the flip flops FF1, FF3, and FF4 is controlled in response to inputs to the input memory section 18 which are not shown in the same manner as the inputs connected to input terminals IN1-IN5 control the switching of the flip flop FF2.

The opening of any one of the contacts SS1, LS1, PS1 or the switching of the flip flop FF1 to its reset state in the initiating circuit concurrently with the opening of any one of the contacts SS2 or LS2 in the holding circuit will prevent terms 1 and 2 from being satisfied and cause the flip flop FF2 to switch to its reset state. Flip flop FF2 has its F output connected to contact input 2 which in turn is connected by a diode D to term 3. Thus, whenever flip flop FF2 is reset, term 3 will not be satisfied and the terminal TO3 will not provide an output and the coil winding C will be de-energized.

The functions of the contacts shown in FIG. 7 can also be expressed in Boolean algebra by the following equations wherein + indicates an OR function and a . represents an AND function:

[(SS1.LS1.PS1.CR1) + (SS2.LS2.CR2.)] . CR3.CR4=CR2C

CR2B = C

These equations can also be expressed as follows:

$$\frac{(1N1)}{SS1} \cdot \frac{(1N3)}{LS1} \cdot \frac{(1N5)}{PS1} \cdot \frac{(1)}{CR1} \cdot \frac{(\overline{3})}{\overline{CR3}} \cdot \frac{(4)}{CR4} = \frac{(2)}{CR2C} \quad (1)$$

$$\frac{(1N2)}{SS2} \cdot \frac{(1N4)}{LS2} \cdot \frac{(2)}{CR2A} \cdot \frac{(\overline{3})}{\overline{CR3}} \cdot \frac{(4)}{CR4} = \frac{(2)}{CR2C} \quad (2)$$

$$(2) = (TO2) \quad (3)$$

CR2B = C

The processor 10 may be programmed directly from the above equations by assigning one input terminal of the input memory section 18 to each external sensing device input as indicated by the designation within the parenthesis above the switching contact designation. The functions of the relay contacts are programmed by assigning a numerical pair of contact inputs to the normally open and normally closed contacts of each relay as indicated by the numerals within the parenthesis over each relay contact and assigning designations to the inputs of the feedback memory F2 which correspond to the contact inputs of the relay contacts as illustrated by the numeral within the parenthesis above relay coil CR2C.

The output devices are programmed by assigning an output terminal to each output device, e.g., output terminal TO2 is assigned to the coil winding C as indicated by th numerals in the parenthesis above the coil winding C. A term of the AND memory 12 is assigned to each equation line as indicated by the numerals within the parenthesis to the left of each equation line.

The programming of the AND memory 12 is accomplished by inserting a diode D in each input 1–6 and each contact input 1—$\overline{1}$ . . . 5—$\overline{5}$ of the AND memory 12 for each switching contact appearing to the left of the equal sign in the equation assigned to the term representing the equation and inserting a jumper between the outputs of each term and the inputs of the feedback memory 22 corresponding to the designation of the relay coil designation to the right of the equal sign in the associated equation. The programming of the processor 10 is completed when a jumper is inserted between the output of the terms and the proper inputs of the output circuit section 26 so the output devices will be energized when all of the inputs to the processor 10 are in their programmed state.

Thus the processor 10 may be programmed directly from relay ladder diagrams or Boolean equations by relatively unskilled persons not having special programming skills. As previously explained, all of the D flip flops within the input memory section 18 are switched simultaneously and all of the D flip flops within the feedback memory section 22 are switched simultaneously to maximize the speed of operation of the processor 10. However, as the switching of the D flip flops within the input memory section 18 and the feedback memory section 22 occurs at different instants, the phenomenon known as relay racing with the processor 10 is eliminated, so the processor 10 operates at maximum speed without providing false output signals in response to changes in its input signals.

Further, the processor 10 may be readily reprogrammed without disturbing the inputs from the sensing devices and the connections to the output devices connected to the processor 10. When a change of the processor 10 program is required, the processor 10 is readily reprogrammed by rearranging the diode pins to provide the required program or replacing the diode chips and reprogramming the chips in the manner previously described. When required, the functions provided within the rectangle 30 may be included in the program provided by the processor 10 by connecting one or more of the selected input terminals 60 to selected output terminals T1-T4 and the output terminal 62 associated with the selected input terminals 60 to selected terminals F1-F5 and/or OT1-OT3 to incorporate the function provided by the selected circuits 64 into the processor 10 program.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A programmable signal processor for controlling the state of a plurality of output signals of the processor in response to the state of a plurality of input signals to the processor, said processor comprising: a programmed AND logic memory having: a plurality of inputs, a plurality of outputs and logic gates interconnecting each output with selected inputs for causing each output to provide an ON signal when all of the inputs associated therewith are ON and an OFF signal when any input associated therewith is OFF, a plurality of gated input memories with each input memory providing a signal to one of the inputs of the AND memory corresponding to the state of one of the input signals to the processor, a plurality of gated feedback memories with each feedback memory providing an ON signal to one of a pair of inputs of the AND memory and an OFF signal to the other input of said pair of inputs when its input is in an OFF state and reversing the signals to the pair of inputs of the AND memory when its input is in an ON state, a plurality of jumpers selectively interconnecting the outputs of the AND memory and the inputs of the feedback memories for causing the feedback memories to switch in an OR logic manner in response to the ON output signals of the AND memory, and a clock providing a pair of phase displaced gating signals to the input memories and the feedback memories for switching the input memories simultaneously and the feedback memories simultaneously at non concurrent instants.

2. The processor as recited in claim 1 wherein the logic gates of the AND memory are diodes.

3. The processor as recited in claim 1 wherein the gated input memories and the gated feedback memories are D flip flop units.

4. The processor as recited in claim 1 wherein the AND memory is programmed by diode pins that are selectively inserted in openings in a diode pin matrix board.

5. The processor as recited in claim 1 wherein the AND memory is provided by a plurality of integrated circuit diode array chips mounted on a printed circuit board and the AND memory is programmed by destroying selected diode circuits in the chips.

6. The processor as recited in claim 1 including a plurality of output circuits each having an input connected by a jumper to an output of the AND memory and an output supplying an output of the processor.

7. The processor as recited in claim 6 including a delay circuit having terminations selectively interposed between the outputs of the AND memory and inputs of the feedback memories and the output circuits.

8. The processor as recited in claim 6 including a counter having terminations selectively interposed between the outputs of the AND memory and the inputs of the feedback memories and the output circuits for causing the selected feedback memories and the output circuits to switch to an ON state after the selected output of the AND memory has switched to an ON state a selected number of times.

9. The processor as recited in claim 6 including a bistable state memory having a pair of input terminations connected to a selected pair of outputs of the AND memory and an output termination selectively connected to the inputs of the feedback memories and the output circuits.

10. The processor as recited in claim 1 wherein each output of the AND memory has a light emitting device associated therewith to visually indicate when the associated output is in the ON state and each feedback memory has a light emitting device associated therewith to visually indicate when the associated feedback memory is switched to an ON state.

11. The processor as recited in claim 7 wherein the time delay circuit provides an input ON signal to the inputs of the feedback memories and output circuits associated therewith a selected time interval after the signal at its associated AND memory output switches to an ON state.

12. A programmable signal processor for controlling the state of a plurality of outputs in response to the state of a plurality of inputs, said processor comprising: a programmed AND memory including a first set of inputs, a second set of inputs, a set of outputs with each of said outputs including a termination that is connectible through individual diodes to selected individual inputs of the first set of inputs and the second set of inputs and causing the termination of each output to provide an output ON signal when all of the inputs associated with the termination are in an ON state and an output OFF signal when any of the inputs associated with the termination are in an OFF state, a plurality of individual gated input memories with each input memory having an output connected to an individual one of the first set of inputs of the AND memory and an input connected to an individual input of the processor for causing its associated output to switch to an ON state in response to a gating signal after its associated input is switched to an ON state and to switch to an OFF state in response to a gating signal after its input signal switches to an OFF state, a plurality of individual gated feedback memories with each feedback memory having a first output providing a normally closed contact function signal connected to a first one of a pair of the second set of inputs, a second output providing a normally open contact function signal connected to a second of said pair of said second set of inputs, and an input connected to a termination for causing the feedback memory to switch the outputs providing the contact functions in response to a gating signal when an input ON signal is present at its associated termination, a plurality of output circuits each including an input termination and means for supplying an output to an individual output of the processor in response to an ON signal at its input termination, a plurality of wire jumpers selectively interconnecting the terminations of the AND memory with the terminations of the feedback memories and the output circuits for causing the feedback memories and the output circuits to switch to an ON state according to an OR logic function in response to the ON signals at the terminations of the AND memory, and clock means providing a pair of phase displaced gating signals with a first of said pair of gating signals providing a gating signal to each input memory for causing the plurality of input memories to switch simultaneously in response to signals at the inputs of the respective feedback memories and a second of said pair of gating signals providing a gating signal to each feedback memory for causing the plurality of feedback memories to switch simultaneously in response to signals at the terminations of the respective feedback memory at an instant different from the instant of switching of the input memories.

* * * * *

UNITED STATES PATENT OFFICE
CERTIFICATE OF CORRECTION

Patent No. 3,950,736      Dated April 13, 1976

Inventor(s) James A. Dix and James J. Eckl

It is certified that error appears in the above-identified patent and that said Letters Patent are hereby corrected as shown below:

Col. 4, line 58, for "1-5" read --$\bar{1}$-$\bar{5}$--;

4, line 61, for "$\bar{1}$-$\bar{5}$" read --1-5--.

Col. 8, line 66, for "an" read --and--.

Col. 9, line 34, for "F" read --$\bar{F}$--;

line 35, for "$\bar{F}$" read --F--;

line 44, for "3" read --$\bar{3}$--.

Col.10, line 5, after "output" insert --at output--.

Col.11, line 19, for "th" read --the--.

*Signed and Sealed this*

Thirty-first *Day of* August 1976

[SEAL]

Attest:

RUTH C. MASON
*Attesting Officer*

C. MARSHALL DANN
*Commissioner of Patents and Trademarks*